(12) United States Patent
Selander et al.

(10) Patent No.: US 8,738,910 B2
(45) Date of Patent: May 27, 2014

(54) METHOD AND ARRANGEMENT FOR ENABLING PLAY-OUT OF MEDIA

(75) Inventors: Göran Selander, Bromma (SE); Yi Cheng, Sundbyberg (SE); Mattias Eld, Spånga (SE); Frank Hartung, Herzogenrath (DE); Michael Liljenstam, Solna (SE); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 35 days.

(21) Appl. No.: 13/514,100

(22) PCT Filed: Dec. 7, 2009

(86) PCT No.: PCT/SE2009/051381
§ 371 (c)(1),
(2), (4) Date: Jun. 6, 2012

(87) PCT Pub. No.: WO2011/071423
PCT Pub. Date: Jun. 16, 2011

(65) Prior Publication Data
US 2012/0246480 A1    Sep. 27, 2012

(51) Int. Cl.
*H04L 9/32*    (2006.01)
(52) U.S. Cl.
USPC ............................................ 713/168
(58) Field of Classification Search
USPC ........................................... 713/168
See application file for complete search history.

(56) References Cited

U.S. PATENT DOCUMENTS

| | | | |
|---|---|---|---|
| 2003/0018917 A1* | 1/2003 | Brown, Sr. | 713/201 |
| 2003/0133446 A1* | 7/2003 | Schoenblum | 370/356 |
| 2005/0094808 A1* | 5/2005 | Pedlow et al. | 380/200 |
| 2006/0190559 A1 | 8/2006 | Lim | |
| 2007/0220163 A1 | 9/2007 | Khouderchah et al. | |
| 2008/0133715 A1 | 6/2008 | Yoneda et al. | |
| 2009/0199231 A1* | 8/2009 | Tsuria et al. | 725/32 |
| 2011/0029999 A1* | 2/2011 | Foti | 725/25 |
| 2011/0058675 A1* | 3/2011 | Brueck et al. | 380/277 |

FOREIGN PATENT DOCUMENTS

| | | |
|---|---|---|
| EP | 1939781 A1 | 7/2008 |
| EP | 1940111 A2 | 7/2008 |
| EP | 2194691 A1 | 6/2010 |

* cited by examiner

*Primary Examiner* — Kambiz Zand
*Assistant Examiner* — Stephen Sanders
(74) *Attorney, Agent, or Firm* — Coats and Bennett PLLC (57) ABSTRACT

Methods and arrangements for enabling the use of a first device (300) for controlling transfer of media content from a content provider (306) to a second device (302). The first device has a pre-established security association with the communications network. When the network detects a request made by the first device for delivery of media content to the second device, key information is established which enables determination of one or more media keys for encryption of the media content. The network sends key information to the content provider and to the first device. The content provider then delivers media content encrypted by the media key(s) to the second device. Further, the first device forward the media key(s) over a local communication link to the second device for decryption of media content encrypted by the media key(s) when delivered by the content provider.

35 Claims, 6 Drawing Sheets

METHOD AND ARRANGEMENT FOR ENABLING PLAY-OUT OF MEDIA

TECHNICAL FIELD

The invention relates generally to a method and arrangement for enabling play-out of media on a rendering device, with added security and control.

BACKGROUND

An architecture called "IP Multimedia Subsystem" (IMS) has been developed to enable multimedia services and sessions for user terminals connected to different access networks. The signalling protocols "SIP" (Session Initiation Protocol) and RTSP (Real-time Streaming Protocol) can be used for initiating media sessions between different parties, as controlled by specific session control nodes in a so-called "IMS core" controlled by an IMS services operator.

Techniques and protocols are also established for multimedia communication between devices in a limited local network using internal addressing and transport means, also referred to as a residential or office network, LAN (Local Area Network), private or home network. The devices in a local network may include any types of entities capable of communication in the network, such as fixed and wireless telephones, computers, media players, servers and television boxes, the latter also called "STB" (Set Top Box).

The architecture called UPnP (Universal Plug-and-Play) can be used for communication in a local network between different devices that may use different operating systems, programming languages, format standards and communication protocols. Further, DLNA (Digital Living Network Alliance) is a recently developed technology for acquiring, storing and accessing media content from devices in a local network.

Figure 1:
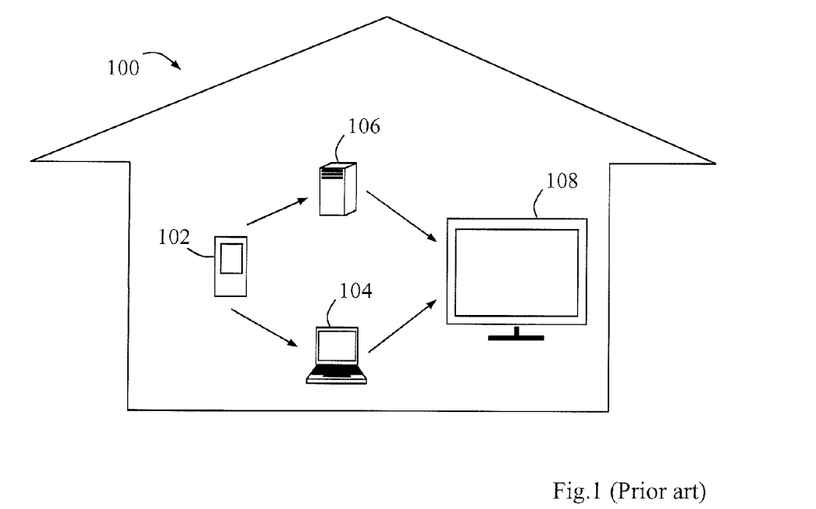
FIG. 1 illustrates a 3-box scenario in a local network, according to the prior art.

In DLNA, different communication schemes have been defined for different scenarios, including the so-called "3-Box" scheme. According to this scenario, which is illustrated in FIG. 1, a first device can be used within a local network 100 for controlling the transfer of media stored on a second device to a third device in the network. Here, a small handheld wireless phone 102 with limited playout capacity is used as a control device to direct either a laptop computer 104 or a media server 106 to stream media content to a TV set 108 in order to play out the content with greater quality as compared to both the handheld device and the laptop computer. The TV set 108 is thus used as a "rendering device".

The concept of IPTV (Internet Protocol TV) has also become widely popular in recent times, where a user can obtain media from an IPTV provider by means of streaming or downloading over the Internet. It is further possible to request media from an IPTV provider using an IMS subscription as credentials for authorising the user and his/her terminal towards the IPTV provider. A user can also obtain the IPTV service to a mobile terminal using a conventional SIM (Subscriber Identity Module) card or similar in the terminal.

Figure 2:
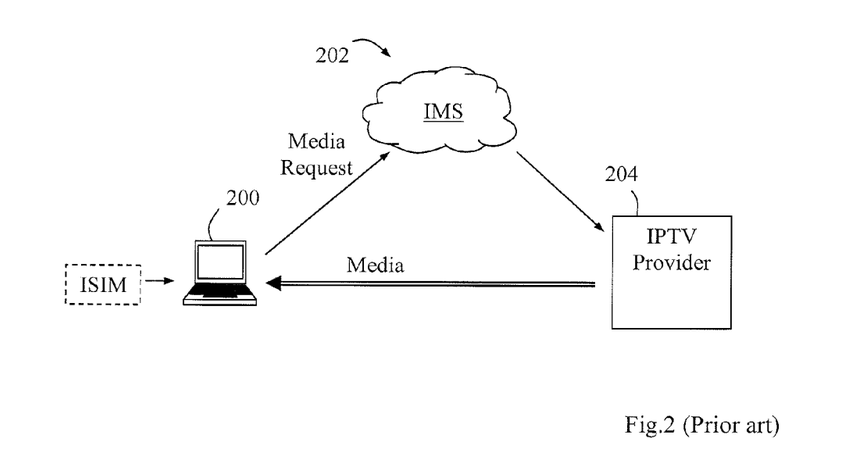
FIG. 2 illustrates schematically how an IPTV service can be accessed, according to the prior art.

When utilising an IMS subscription, a corresponding ISIM (IMS SIM) is typically required for gaining access to the IPTV service. FIG. 2 illustrates this situation where an ISIM is installed in a laptop computer 200 or other IMS-enabled communication device, which then requests for media via an IMS core 202 from an IPTV provider 204. After the IMS core 202 has authorised the requested media transfer to computer 200, the IPTV provider 204 can allow media to be streamed or downloaded thereto over a public transport network such as the Internet. Thereby, the user is able to consume TV content on the IMS-enabled device 200 according to his/her IMS subscription and utilising a pre-established security relation with the IMS operator and using the ISIM to provide valid credentials.

In addition, it would be desirable to enable a user to play out content on an external visited rendering device, as obtained from an IPTV provider or from any other provider of any content such as TV programs, films, any visual and/or audio content, game related content, and so forth. For example, a user may stay at a hotel or visit a friend and want to obtain and play out media on a TV set at the hotel or friend's home, using his/her IMS subscription. However, this may not be possible unless the user can insert a movable ISIM into the visited device and use it for accessing the IMS core to be authorised to obtain the media from the provider. Obviously, many user devices such as TV sets are not equipped to receive and handle such an ISIM or corresponding movable credentials tool.

Another problem that can be identified when not being able to use valid IMS credentials or similar for obtaining media to a visited rendering device, is that neither the user nor the content provider can have secure control of the media transfer to the rendering device. For example, the content provider may not know if the content is accessed only by an authorised party, and conversely the user cannot be sure the content is delivered in a proper manner.

Another problem generally associated with media deliveries from an external content provider is that the user is not able to stop the media transfer if, for some reason, he/she is not satisfied with or ready for the delivery. For example, the rendered quality may not be up to expected standard, or the content may be received incompletely or not at all. A visited rendering device may further be unable to play out the received media format in a proper manner. The user may even have requested the wrong media content or type of media by mistake, and so forth. On the other hand, the content provider also cannot discover if the requesting user has stopped receiving media, e.g. due to intentional power-down or unintentional loss of connectivity.

SUMMARY

It is an object of the invention to basically address at least some of the problems outlined above. Further, it is an object to provide a solution for enabling secure transfer of media to a visited device that may not be capable of authorization and/or to use an IMS subscription. These objects and others may be obtained by providing a method and arrangement according to the independent claims attached below.

According to one aspect, a method is provided in a communications network for enabling the use of a first device for controlling transfer of media content from a content provider to a second device. It is assumed that the first device has a pre-established security association with the communications network. When a request, made by the first device for delivery of media content to the second device, is detected that is directed to the content provider, key information is established which enables determination of one or more media keys for encryption of the media content. The key information includes first and second sets of key information. The first set of key information is then sent to the content provider and the second set of key information is sent to the first device. When the content provider delivers the requested media content encrypted by the media key(s) to the second device, the first device is able to forward the media key(s) or information thereof over a local communication link to the second device for decryption of the media content.

According to another aspect, an arrangement is provided in a communications network node configured to enable the use of a first device for controlling transfer of media content from a content provider to a second device, the first device having a pre-established security association with the communications network. According to this arrangement, a detecting unit in the network node is adapted to detect a request made by the first device for delivery of media content to the second device, the request being directed to the content provider. Further, a key unit in the network node is adapted to establish key information which enables determination of one or more media keys for encryption of the media content, including first and second sets of key information.

The arrangement in the network node also comprises a first communication unit adapted to send the first set of key information to the content provider, thereby enabling the content provider to deliver the requested content encrypted by the media key(s) to the second device. The arrangement in the network node also comprises a second communication unit adapted to send the second set of key information to the first device, thereby enabling the first device to forward the media key(s) or information thereof over a local communication link to the second device for decryption of media content encrypted by the media key(s) when delivered by the content provider.

Different embodiments can be used in the method and arrangement in the communications network above. In one possible embodiment, the established key information is used for determination of a series of media keys to be used in a pre-determined order for encryption of the requested media content, and information regarding each media key is sent successively to the first device. Thereby, the communications network is able to stop the delivery of content encrypted by the media key(s) by stopping the sending of key information.

In another possible embodiment, a key identifier associated with each media key is sent to the first device and forwarded to the second device, and the content provider adds the key identifier to media content encrypted by the associated media key, for synchronisation between received media and media keys in the second device. In any of the above embodiments, the media keys may be changed at preset time intervals or for preset chunks of delivered content.

In another possible embodiment, successive requests for key information are needed from the first device for sending information on the successive media keys to the first device. Thereby, also the first device is able to stop the delivery of content by ceasing the requests for key information. The requests for key information may be received in SIP Subscribe messages from the first device, and the information on the successive media keys may be sent in SIP Notify messages to the first device in response to the SIP Subscribe messages. This procedure can thus be facilitated by using existing SIP message types.

In further possible embodiments, the key information comprises one or more explicit media keys or one or more implicit media key related parameters from which the media key(s) can be determined. The pre-established security association may involve a first base key, and the one or more implicit media key related parameters may include at least one nonce, wherein the media key(s) can be derived from the first base key and the nonce(s). Further, the first set of key information sent to the content provider may comprise a second base key dependent of the first base key, and the content provider then uses the second base key to derive a series of media keys and sends information regarding the media keys successively to the first device.

In further possible embodiments, the content request from the first device contains connection parameters of the second device which are used by the content provider for delivering the media content to the second device.

The request may be detected when received at the network from the first device. Alternatively, the request may be detected when the content provider has received the request from the first device, and the content provider may send key information to the first device in accordance with GBA (Generic Bootstrapping Architecture) as specified in 3GPP, and wherein the first device can generate the media keys therefrom.

According to another aspect, a method is provided in a first device for controlling transfer of media content from a content provider to a second device. In this method, the first device establishes a local communication link with the second device. The first device also makes a request for delivery of media content to the second device, the request being directed to the content provider. Again, it is assumed that the first device has a pre-established security association with a communications network. The first device then receives key information which enables determination of one or more media keys for decryption of the media content. The first device also forwards the media key(s) or the key information over the local communication link to the second device, thereby enabling the second device to decrypt media content when received from the content provider.

According to another aspect, an arrangement is provided in a first device for controlling transfer of media content from a content provider to a second device. According to this arrangement, a local communication unit in the first device is adapted to establish a local communication link with the second device, and an external communication unit in the first device is adapted to make a request for delivery of media content to the second device. Again, the first device has a pre-established security association with a communications network and the request is directed to the content provider.

The external communication unit in the first device is also adapted to receive key information which enables determination of one or more media keys for decryption of the media content from the communications network. Further, the local communication unit in the first device is adapted to forward the media key(s) or the key information over the local communication link to the second device, thereby enabling the second device to decrypt media content when received from the content provider.

Different embodiments can be used in the method and arrangement in the first device above. In one possible embodiment, connection parameters of the second device are obtained over the local communication link and the request is sent with the connection parameters to the communications network or to the content provider. In another possible embodiment, the established key information is used for determination of a series of media keys to be used in a pre-determined order for encryption of the requested media content. In that case, the first device receives information regarding each media key successively from the communications network or from the content provider, thereby enabling the communications network or the content provider to stop the delivery of content encrypted by the media key(s) by stopping the sending of key information.

The first device may further receive a key identifier associated with each media key and forwards the key identifier to the second device. The content provider adds the key identifier to media content encrypted by the associated media key, for synchronisation between received media and media keys in the second device.

The first device may also send successive requests for key information to obtain information on the successive media keys, thereby enabling also the first device to stop the delivery of content by ceasing the requests for key information. In that case, the first device may send the requests for key information in SIP Subscribe messages, and receives the information on the successive media keys in SIP Notify messages in response to the SIP Subscribe messages.

The key information above may comprise one or more explicit media keys or one or more implicit media key related parameters from which the media key(s) can be determined. The pre-established security association may involve a base key and the one or more implicit media key related parameters may include at least one nonce, wherein the media key(s) can be determined from the base key and the nonce(s).

In further possible embodiments, the first device sends the request to the communications network or to the content provider. In the latter case, the first device may receive key information from the content provider, in accordance with GBA (Generic Bootstrapping Architecture) as specified in 3GPP, to generate the media keys therefrom.

Further possible features and benefits of the invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Briefly described, the invention can be used to enable secure transfer of media content from a content provider to a device for rendering the media content, as controlled by another device operated by a user, by employing encryption and possibly also integrity protection of the transferred content in a manner to be described below.

Basically, a first device acting as a control device in this context for media transfer to a rendering device, has a pre-established security association with a communications network, e.g. by means of credentials in the first device such as a SIM, ISIM or the like, and a shared base key established as part of an authentication procedure using the above credentials. A secure communication link to the first device can thus be created which is utilised in this solution for securely conveying information on media keys from the network to the first device, which is forwarded to the second device when encrypted media content is delivered from the content provider. The first device thus forwards the key information received from the network to the second device over a local link deemed to be protected from interception or eavesdropping, such as a Bluetooth, NFC (Near Field Communication), Infrared, or cable connection. Thereby, no security association nor secure link to the network are needed for the second device and any visited "foreign" device can be used, e.g. at a hotel, for rendering the media content.

When the first device makes a request for media content, a suitable node or function in the communications network thus establishes key information which enables determination of one or more media keys for encryption of the media content, and sends the key information to the first device and to the content provider. The network may send the same or different key information to the first device and the content provider, respectively, depending on the implementation which will be described in more detail later below.

The key information may be further related to a base key established with the first device during initial registration of the device, i.e. before the content request is made. The first device may send the content request either to the network or directly to the content provider, which will be described for different exemplary procedures below. The network node may be an operator controlled node. For simplicity, the following examples will refer to a single network node, although more than one node or function in the network may be involved in practice, and the invention is thus not limited to just using one distinct network node.

The content provider is then able to derive the media key(s) from the received key information, encrypt the media using the media key(s), and deliver the encrypted media to the second device, either using data streaming or file transfer. An operator-controlled network node or the content provider itself may generate and send the media key(s) or information thereof to the first device for decryption of received media in the second device.

The key information sent to the first device and to the content provider may comprise one or more explicit media keys or one or more implicit media key related parameters such as a "nonce", which is a commonly used term representing a "number used once", although not being literally restricted thereto in this context. The media key(s) can then be derived from the base key and the nonce, e.g. by means of a predetermined key determination function applied to the nonce and the aforementioned base key. As mentioned above, the key information sent to the first device may in some specific embodiments be different from the key information sent to the content provider. For example, the content provider may itself generate and send encrypted media keys to the second device, together or separately from the encrypted media, and may also send key information related to the encrypted media keys to the first device, optionally via a node or function in the communications network.

Figure 3:
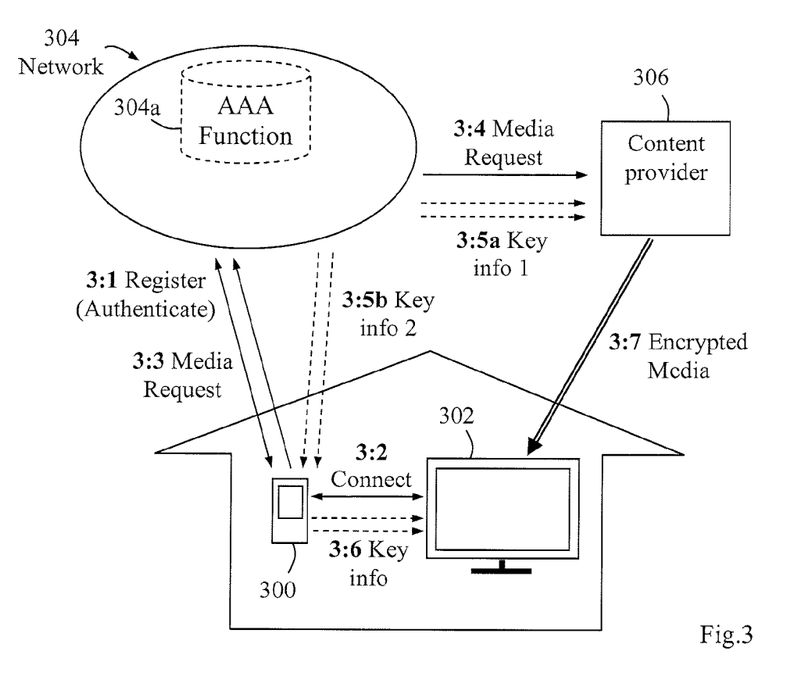
FIG. 3 is a schematic communication overview illustrating an exemplary procedure for enabling secure playout of media on a rendering device, in accordance with some possible embodiments.

An exemplary procedure for enabling authorised retrieval and playout of media on a rendering device, as controlled by another device operated by a user, is illustrated in the schematic communication overview of FIG. 3. It is assumed that the user, operating a first device 300 such as a mobile phone, is visiting a hotel or other residence in which a second device 302, in this case a TV set, is available. It is also assumed that the first device and its user have a pre-established security association with a communications network 304, e.g. a "home network" of the user which could be an IMS network providing multimedia services or an access network providing communication access. In this context, the term home network basically refers to the user's telephone subscription network operator.

The first device 300 is also equipped with a SIM, ISIM or similar entity which is valid as credentials towards the network 304, effectively authorising device 300 for services towards the network 304. As indicated above, one or more suitable nodes or functions in the network 304 may be used for the below procedure depending on the implementation and type of network. For example, if the network 304 is an IMS network, one or more so-called CSCF (Call Session Control Function) nodes may handle the procedure.

In this example, the user wants to watch media content that can be obtained from a content provider 306, e.g. using an IPTV service or similar. However, his/her own device 300 has insufficient capabilities to play out the content to the user's satisfaction due to a small screen and poor sound. Transferring the media from the content provider 306 to the device 300 may also be unsuitable since a wireless link has typically limited bandwidth and generally high transmission costs. However, the TV set 302 in the visited location is capable of presenting the media with much larger and better picture and better sound quality, also having a broadband link with more bandwidth and lower transmission costs. The user therefore desires to utilise the TV set as an external rendering device for enjoying the media content, as follows.

In the shown procedure, the first device 300 at some point registers with the network 304 in a first operation 3:1, such as when the device 300 is powered on or when the user actively triggers the registration in a suitable manner, depending on the type of network and/or protocols used. During the registration, the device 300 is authenticated with the network 304, e.g. by means of a SIM/ISIM or other valid credentials tool in the device, based on the above pre-established security association.

The network 304 may comprise a conventional so-called "AAA" (Authentication, Authorisation, Accounting) function 304a which can be used during the registration procedure, e.g. involving an IMS HSS (Home Subscriber Server) in the network. The authentication may further be done according to AKA (Authentication and Key Agreement). However, any suitable and available authentication procedure may be used, depending on the type of credentials used according to implementation, and the invention is not limited in this respect as long as network 304 and first device 300 share a security association, e.g. in the form of a base key established by an AKA using ISIM credentials, or by some other suitable key establishment procedure, e.g. using Diffie-Hellman, Kerberos, or certificate based procedures.

Typically, a communication link is also established between device 300 and the network 304 once the device 300 has been successfully authenticated in network 304, and this link is deemed secure which is utilised in this solution for conveying sensitive encryption information. The security of this link may be obtained from the aforementioned base key or some key related thereto.

The device 300 also establishes a local communication link with the TV set 302 using a suitable technique for "short-range" communication such as, e.g., NFC, Bluetooth, Infrared, a USB cable or the like, in a next operation 3:2. The local link may further be established using the above-described mechanisms for UPnP and DLNA, although the invention is not limited to any particular types of local link. It is assumed that the local link is restricted to a limited distance, space or room and is thereby basically protected from interception or eavesdropping, and can thus be considered secure as well.

Device 300 may further obtain connection parameters over the established local link from the TV set 302, e.g. during establishment of the local link (sometimes referred to as a "pairing" procedure), which can be used for external communication with the TV set 302. Alternatively, the connection parameters may simply be presented on the screen of TV set 302 for the user to read and enter manually in the device 300. These connection parameters may include an IP address or other network address associated with the TV set 302 that can be used for transmission of media thereto over a public network. It is also possible to use an address associated with a TV multicast group if IP multicasting is employed and device 302 is a member of the multicast group.

In a next operation 3:3, the user has selected some desired media content which is available from the content provider 306, and triggers device 300 to make a request for the media content, which in this case is sent to the network 304. The request is directed to the content provider 306 and may comprise connection parameters of the TV set 302, if obtained previously over the local link, such that network 304 can convey these parameters to the content provider 306 for the forthcoming delivery of media content to the TV set 302. Before selecting media content, the user may browse for any content available from the content provider 306, either from the first device 300 or the TV set 302 and using any suitable and available browsing mechanism, which is however somewhat outside the scope of this solution.

When receiving the request, network 304 may check if device 300 is authorised to receive the requested content. Depending on the implementation, device 300 may have been authenticated and authorised with the network 304 earlier in operation 3:1, or may alternatively be so with the content provider 306 after the request. If the device 300 is found to be properly authorised, network 304 sends the content request to content provider 306, in a further operation 3:4. If received in the request from device 300 in operation 3:3, the network 304 includes the connection parameters of TV set 302 in the request.

Next, the network 304 establishes key information which enables determination of one or more media keys for encryption of the requested media content. The network 304 sends a first set of key information to the content provider 306 in an operation 3:5a and sends a second set of key information to the first device 300 an operation 3:5b, which operations may be executed in any suitable order or in parallel, more or less. As indicated above, the first and second sets of key information sent to the content provider and to the device, respectively, may be the same or different information.

Furthermore, the device 300 will forward its received key information over the local link to the TV set 302, in an operation 3:6, which enables TV set 302 to decrypt the media content when received from the content provider 306. The content provider 306 is able to determine the media key(s) using the key information received in operation 3:5b, encrypt the requested content by the media key(s), and deliver the encrypted content by streaming or file transfer to the TV set 302, as shown in a final operation 3:7. In the case of file transfer, the file may be delivered in successive chunks to enable the device and/or the content provider to stop the transfer before content delivery has been completed, which will be described in more detail later below.

In some different possible alternatives, the key information sent in operations 3:5a,b may comprise one or more explicit media keys "MKj" generated by the network, or one or more implicit media key related parameters from which the media key(s) can be derived using a predetermined Key Determination Function "KDF".

In the former case, each media key MKj is, when transmitted to the first device, preferably encrypted by a "key protecting key, KPKj". The media key MKj may also be encrypted when sent to the content provider, although this link could itself be protected by other means and explicit encryption may thus not be needed. Hence, the explicit key information sent to the content provider is not necessarily the same as that sent to the first device, although the final result will be that the first device, or rather the second device, and the content provider are able to obtain the same media key, MKj, though possibly based on different received key information.

In the latter case, the implicit media key related parameter(s) could include at least one freely selected parameter or altering value that could be denoted "NONCE". The nonce may be a random number or a sequence number. A media key MKj can then be derived from a "key generating key" KGKj and the NONCE parameter using the key determination function KDF, basically as follows:

$$MKj = KDF(KGKj, NONCE) \quad (1)$$

In either of the former and latter cases above, the key protecting key KPKj and the key generating key KGKj, respectively, are preferably the aforementioned base key or a key derived therefrom. Thus, the second set of key information sent to the first device is related to this base key in the sense that it is combined with the key information to enable the first device to establish the media key(s). However, it may not be necessary to include the base key in the key information as it is typically already known to the first device from the registration process above.

According to further possible alternatives, the first and/or second sets of key information may relate to a sequence of media keys used in a predetermined order for encryption of the requested media content. In that case, information regarding each media key MKj, where j=0, 1, 2, . . . is sent successively from the network 304 to device 300 and to the content provider 306. In one possible embodiment, the sequence of media keys is defined by a sequence of nonces, each combined with the aforementioned base key. Thus the key information sent to the first device comprises one or more nonces. Effectively, the media keys will change over time.

The media keys may be changed at preset time intervals or for preset chunks of delivered content, when using either data streaming or file transfer for the content delivery. Thereby, any one of the device 300 and the content provider 306 is able to stop the delivery of content by stopping the communications network from sending the key information.

For example, the user may be dissatisfied with the delivered content, or it may not be received and/or rendered properly at the TV set 302 for whatever reason. In this case, information on subsequent keys should not be supplied to the content provider 306, disabling him from encrypting further content. On the other hand, the content provider 306 may suspect that the authorisation was falsely made, or the user's payment or credit, if any, may be insufficient for the content delivery, and so forth. In this case, the device 300 should not receive information on subsequent keys, thereby disabling the second device to decrypt further content.

Figure 4:
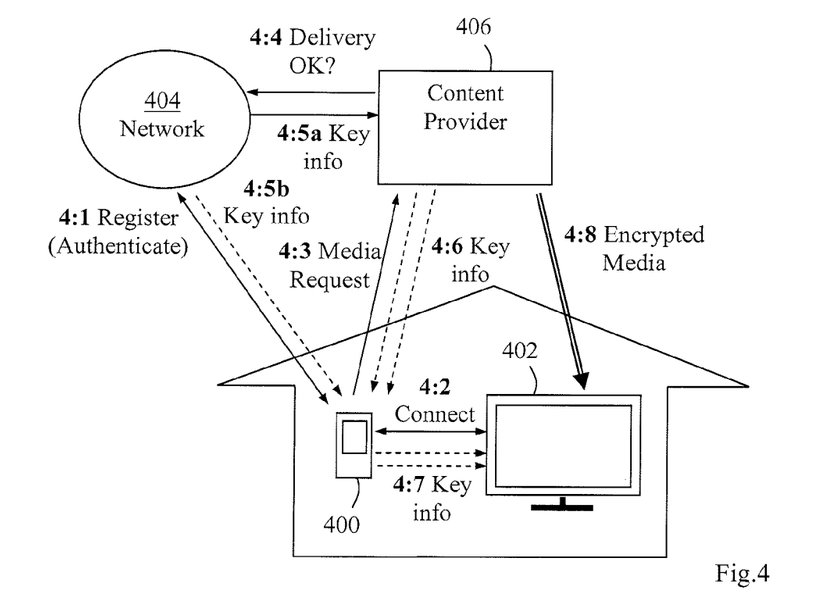
FIG. 4 is a schematic communication overview illustrating another exemplary procedure for enabling secure playout of media on a rendering device, in accordance with some further possible embodiments.

FIG. 4 illustrates another exemplary procedure for enabling a first device 400 to control authorised retrieval and playout of media content on a rendering second device 402, based on a pre-established security association with a communications network 404, the content being delivered by a content provider 406. The second device 402 is likewise illustrated as a TV set in this example. In this case, the initial request for media content from device 400 is sent directly to the content provider 406 which then sends key information successively to the first device 400, as described below. The presumptions are otherwise basically the same as for FIG. 3, which will therefore not be repeated here again.

As in the previous example, the first device 400 registers with network 404 in a first operation 4:1, effectively authorising the device for forthcoming media delivery from content provider 406, and establishes a local link with device 402 in a next operation 4:2, basically in the manner of the above operations 3:1 and 3:2, respectively. As in the previous example, a base key shared between the network 404 and the device 402 is typically also creates in this operation. Next, the user triggers device 400 to send a request directly to the content provider 406 this time, for delivery of media content to the second device 402, in a following operation 4:3.

The content provider 406 then determines whether the device 400 is authorised for such media delivery, by sending a suitable authorisation query to the network 404 in a further operation 4:4. Assuming that the network 404 can acknowledge that device 400 is authorised in this case, it also establishes key information for determination of one or more media keys for encryption of the requested media content, and sends the key information to the content provider 406 in an operation 4:5a. The key information sent to the content provider may comprise the base key, BK, or in general a key derived therefrom, BK'. The aim of this embodiment is to create a common key, shared between the first device and the content provider. Thus, in the case the common key BK' is derived from the base key BK, the network possibly also needs to ensure that the first device can establish corresponding key information, BK' by sending key information thereto in an optional operation 4:5b.

When a sequence of media keys, MKj, j=0, 1, 2, . . . is employed for encryption of media, the content provider 406 may generate the media keys from the key information received in operation 4:5a, e.g. a key generating key KGKj in dependence of BK', and a series of nonces in algorithm (1) above. The content provider 406 may then send each nonce, one at a time, as key information to the first device 400, as illustrated in an operation 4:6, thereby enabling the first device 400 to derive or determine each corresponding media key and send it to the second device 402 in an operation 4:7. Alternatively, the content provider may use the key BK' as a key protecting key, KPKj, in analogy with the previous embodiment.

The content provider 406 will encrypt the requested media content by the media key(s), and deliver the encrypted media to device 402, as shown in a final operation 4:8. Device 402 can then use the received media keys to decrypt media content received from the content provider 406. Alternatively, the first device 400 may transfer the key BK' to the second device 402 over the local link. The content provider 406 may then send the key information directly to the second device, which is then able to derive the media key locally based on the base key and the received key information.

The generation of media keys from a base key and a series of generated random values R1, R2, . . . is similar to, as well as compatible with, an existing mechanism referred to as GBA (Generic Bootstrapping Architecture), as specified in 3GPP TS 33.220. In this case, the content provider would act as a so-called NAF (Network Application Function) and the device and the content provider shares a base key often denoted "KS_NAF" which is used as a "key generating key", KGKj. In the example of FIG. 4, content provider 406 will send each nonce or random value used for determination of the actual media keys, as key information to the first device 400 in operation 4:6, wherein device 400 can locally generate the media keys therefrom and using a predefined Key Determination Function KDF, according to (1).

Clearly, there are several possibilities of generating one or more encryption keys and/or conveying various key information to the first device and/or the content provider, and the invention is not limited in this respect. As long as the first device can be authorised by the network to control the content delivery from the content provider to the second device, and the first device can forward received key information to the second device over a local link, no secure connection is needed between the content provider and the second device for transfer of media keys, and it is not necessary to authorise the receiving second device.

An exemplary procedure in a communications network for enabling the use of a first device to control transfer of media content from a content provider of media for playout on a second device, will now be described with reference to the flow chart in FIG. 5. As in the above examples, the first device has a pre-established security association with the communications network. Without limitation, the shown procedure may be executed by a suitable node or function in the communications network.

In a first step 500, a request from the first device directed to the content provider for delivery of media content to the second device, is detected. This content request can be detected by the network in different ways, e.g. when the network itself receives the request from the first device as in operation 3:3 in FIG. 3, or, when the network receives the authorisation query from the content provider in the case when the first device has sent the request directly to the content provider as in operation 4:4 in FIG. 4.

A next step 502 illustrates that the network basically determines if the first device is authorised for delivery of the requested media content, which may be based on an earlier made registration of the first device as shown in operations 3:1 and 4.1 in FIGS. 3 and 4, respectively. If the first device is not authorised, the content request is rejected or otherwise refused, in a step 504, depending on the implementation.

On the other hand, if the first device is found to be authorised in step 502, the request may be sent to the content provider as shown in an optional step 506, if not already received by the content provider as in operation 4:3 in FIG. 4. Having somehow detected the content request, the network establishes key information, in a next step 508, which enables determination of one or more media keys for encryption of the media content. As described above, the key information may be conceived in several different ways without limitation to this invention. The established key information basically comprises first and second sets of key information to be provided to the first device and the content provider, respectively. As mentioned above, the first and second sets of key information may be different or the same information depending on the implementation.

Then, the first set of key information is thus sent to the content provider in a step 510, and the second set of key information is sent to the first device in a step 512. Thereby, the content provider is able to deliver the requested media content encrypted by the media key(s) to the second device, as shown in operations 3:7 and 4.8 in FIGS. 3 and 4, respectively. Furthermore, the first device is able to forward the media key(s) or information thereof over a local communication link to the second device, as shown in operations 3:6 and 4.7 in FIGS. 3 and 4, respectively, for decryption of received media content.

Figure 6:
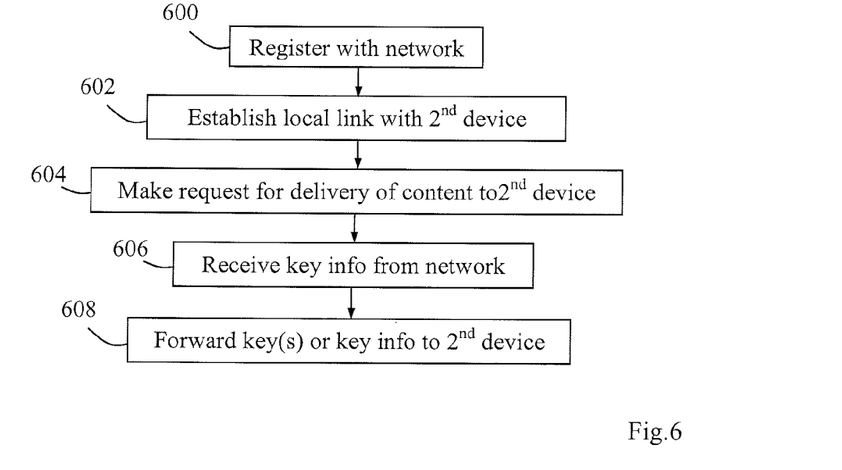
FIG. 6 is a flow chart illustrating a procedure in a first device for enabling secure playout of media on a second device, in accordance with another embodiment.

An exemplary procedure in a first device for controlling transfer of media content from a content provider to a second device, will now be described with reference to the flow chart in FIG. 6. Again, it is assumed that the first device has a pre-established security association with a communications network. The shown steps are thus executed by the first device.

In a first step 600, the first device registers with the network, as in operations 3:1 and 4.1 in FIGS. 3 and 4, respectively, involving authentication of the device with the network based on the above pre-established security association, e.g. using a SIM/ISIM or similar credentials tool in the device. A base key shared with the network is typically also created in the registration. In a following step 602, the first device establishes a local communication link with the second device, e.g. using NFC, Bluetooth, Infrared, a USB cable or the like as in operations 3:2 and 4.2 in FIGS. 3 and 4, respectively. The local link can be considered secure from eavesdropping or detection by other parties.

When triggered by a user in a suitable manner, the first device makes a request for delivery of media content to the second device, in a next step 604, the request being directed to the content provider. As described above, the first device may send the content request to the network as in operation 3:3 in FIG. 3, or directly to the content provider as in operation 4:3 in FIG. 4.

Figure 5:
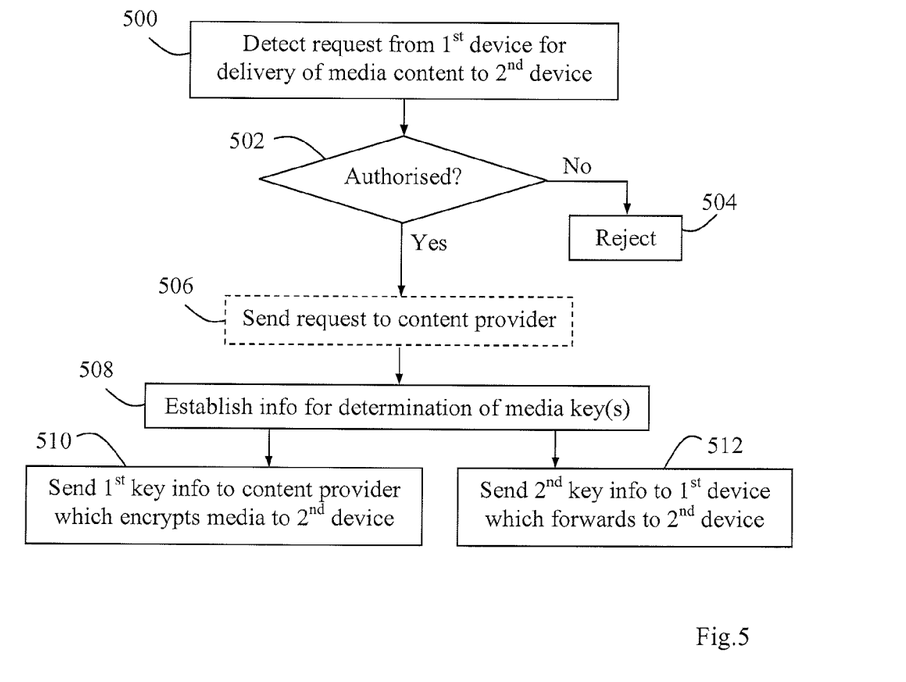
FIG. 5 is a flow chart illustrating a procedure in a communications network for enabling secure playout of media on a rendering device, in accordance with another embodiment.

Then, the first device receives key information from the communications network, in a further step 606, i.e. corresponding to the second set of key information in the procedure of FIG. 5, which enables determination of one or more media keys for decryption of the media content. Again, as mentioned above, useful key information such as a base key may be established with the communications network during the registration of step 600, and successive key information such as a series of media keys or nonces from which media keys can be derived, may be received from the content provider during delivery of the requested content to the second device.

The first device then forwards the media key(s) or the key information over the local communication link to the second device, in a final shown step 608. Thereby, the second device is able to decrypt media content when received from the content provider, using the key information forwarded by the first device. Alternatively, in embodiments using a base key and one or more nonces, the first device may forward the base key and the nonce(s) as key information to the second device, allowing the second device to derive the media keys therefrom.

The above procedures in the communications network and first device, respectively, may be implemented according to some exemplary embodiments. For example, the first device may obtain connection parameters of the second device over the local communication link and send the content request with the connection parameters to the communications network or to the content provider. In this way, the content provider will be able to use the second device's connection parameters for transferring media thereto.

Further, the key information established by the network may be used for determination of a series of media keys to be used in a pre-determined order for encryption of the requested media content, such that information regarding each media key is sent successively to the first device. A key identifier associated with each media key may also be sent to the first device and forwarded to the second device, and the content provider then adds the key identifier to media content encrypted by each associated media key, for synchronisation between received media and media keys in the second device. The media keys may be changed at preset time intervals or for preset chunks of delivered content.

In that case, the network may also require successive requests for key information from the first device for sending information on the successive media keys thereto. The first device is then able to stop the delivery of content by ceasing the requests for key information such that the network stops the content provider from sending encrypted media to the second device, e.g. by sending a suitable control message to the content provider, or by simply not sending any further key information to the content provider.

In one possible embodiment, the stopping of media delivery may be initiated by the second device. For example, the second device may detect some error in media transmission/decoding/quality and may, over the local link, report the failure to the first device, which in turn ceases the requests for key information or sends a suitable control message to the network to stop further media delivery. The control message is preferably authenticated using a key known only to the first device and the network, e.g. a key related to the aforementioned base key.

If SIP is used as communication protocol between the first device and the network, the existing subscribe/notify mechanism may be used. Thus, the first device may send the requests for key information in SIP Subscribe messages or SIP OK messages, and the network may send the information on the successive media keys in SIP Notify messages to the first device in response to the SIP Subscribe or OK messages. In that case, the first device is able to stop content delivery by cancelling the subscription, or by refraining from sending SIP Subscribe or OK messages, etc.

Figure 7:
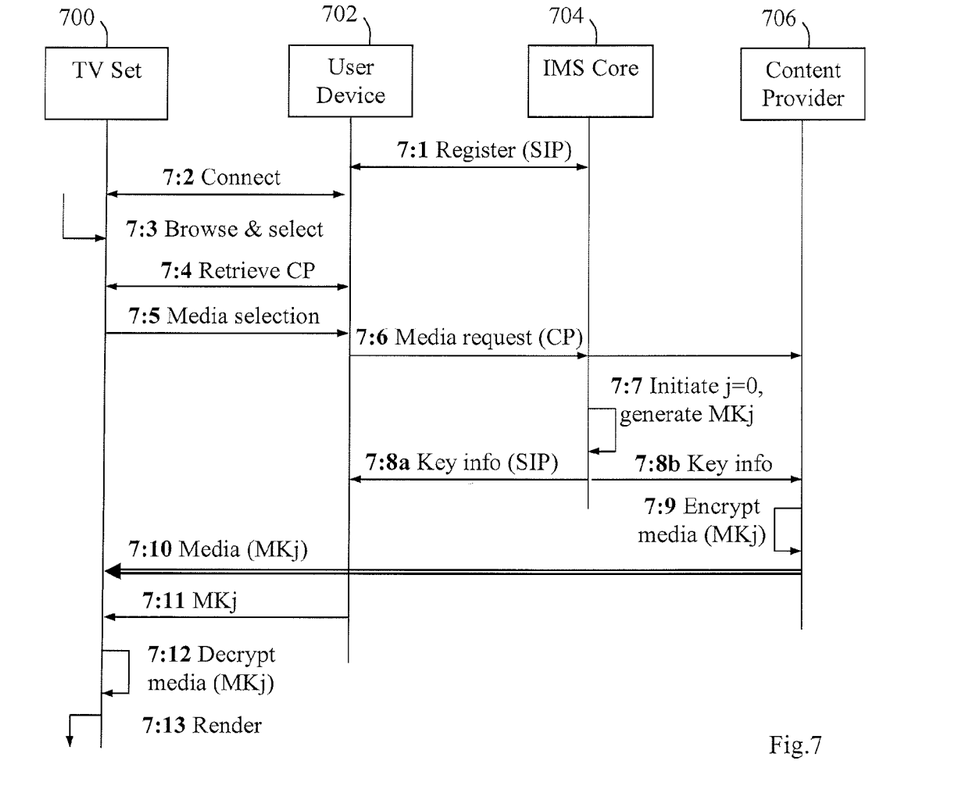
FIG. 7 is a signalling diagram illustrating in more detail how the inventive solution can be implemented in practice, in accordance with further embodiments.

An example of how the inventive solution can be implemented in practice will now be described with reference to the signalling diagram in FIG. 7, involving a TV set 700 as a rendering device at a visited location, a portable device 702 operated by a user, an IMS core 704 representing the above-described communications network, and a content provider 706 being connected to the IMS core 704. As in the above examples, it is assumed that the user device 702 has a pre-established security association with the IMS core 704, which is utilised as follows.

A first step 7:1 illustrates that user device 702 is registered in the IMS core 704, involving authentication and authorisation of user device 702 towards IMS core 704. This step will also create a base key which, using IMS standard notation is denoted (CK, IK). In more detail, two keys are created but any suitable combination or function of the two keys may be identified as the base key. A next step 7:2 illustrates that user device 702 establishes a local link with TV set 700, using a suitable short-range communication technique such as Bluetooth, a USB cable, etc, which is deemed secure from eavesdropping. A further step 7:3 illustrates that the user uses the TV set 700 to browse for media available from the content provider 706 and selects media content for delivery to the TV set 700.

A next step 7:4 illustrates that user device 702 also retrieves connection parameters from TV set 700 over the local link, which can be used by the content provider to deliver the requested media. The selected media content is then transferred to the TV set 700 over the local link, in a further step 7:5. Alternatively, the user may read a suitable identification of the selected content on the TV set 700 and then input the content identification manually in the user device 702.

In a following step 7:6, device 702 is triggered by the user to make a request for the selected media content, e.g. when a content identification is received, either from the TV set 700 over the local link or manually from the user as said above. In this example, the content request, containing the connection parameters of TV set 700, is first received by the IMS core 704 which forwards the request on to the content provider 706. Thereby, the IMS core is also triggered to initiate the determination of media encryption keys MKj, as shown in a further step 7:7. As a series of media keys MKj will be used for successive encryption, e.g. j=0 for the first media key as shown in the figure.

Then, the IMS core 704 sends the determined media keys MKj one by one to user device 702 in a step 7:8a, using SIP in this example, and to content provider 706 in a step 7:8b, respectively. In this case, the key information sent to user device 702 and to content provider 706 is the same, i.e. the explicit media keys.

A next step 7:9 illustrates that content provider 706 encrypts media using each key MKj, and the encrypted media is delivered as the requested content to TV set 700 in a following step 7:10. User device 702 also forwards the received media keys MKj to TV set 700 in a further step 7:11, and TV set 700 can then decrypt the received media in a step 7:12 and render it in a last shown step 7:13. When using a sequence of media keys MK0, MK1, KM2, . . . for encryption, the steps 7:7-7:13 are repeated during continuous delivery of the requested content until delivery has been completed or stopped, which will be described in more detail further below. Each time step 7:7 is executed for the next media key, j is incremented such that j=j+1.

As mentioned above, a key identifier may also be sent with each media key in steps 7:8a and b, and the content provider then adds the key identifier to media content encrypted by each associated media key, for synchronisation between received media and media keys in the second device. If the SRTP (RFC3711) protocol is used for media delivery, the so-called "MKI field" of the packets may be used to convey these key identifiers. If IPsec is used, the "SPI field" may be used in this manner, and so forth. For instance, in order to signal that media key MKj is to be used, the MKI or SPI field may be set to the value "j", and so forth. The media keys may be changed at preset time intervals, which may be suitable when using data streaming, or for preset chunks of delivered content which may be suitable when using file transfer.

Figure 8:
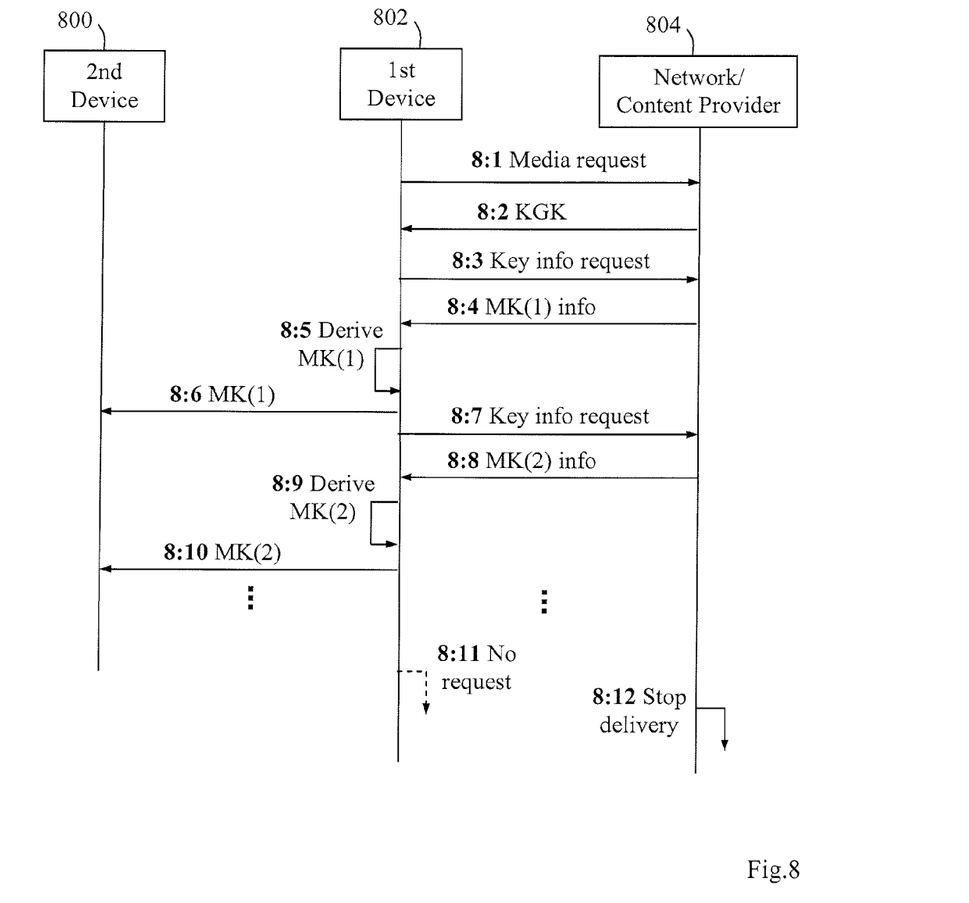
FIG. 8 is a signalling diagram illustrating how the first device can control delivery of media content, in accordance with further embodiments.

As also mentioned above, the first device may be required to send successive requests for information on the successive media keys, and is thereby able to control the delivery of content by means of these requests. FIG. 8 is a signalling diagram illustrating in more detail how a first device 802 can control delivery of media content to a second device 800, in accordance with further embodiments. In this example, the first device 802 is required to send successive requests for key information either to the communications network or to the content provider, jointly denoted 804, depending on which one supplies the successive key information to the first device according to the embodiments described above. Thus, delivery of each chunk or interval of media is dependent on whether a key information request has been received from the first device or not. For example, the first device may generate a next key request in response to reception of an acknowledgement from the second device over the local link, basically saying that rendering of media decrypted by the previous media key has proceeded correctly.

In a first shown step 8:1, the first device makes a request for delivery of media content, which request can be sent to the network or to the content provider, hereafter referred to as "network/CP" 804 for short. The network/CP 804 then responds by sending, or otherwise establishing, a key generating key KGK to device 802, in a next step 8:2, which could be the above-mentioned base key. In order to start the content delivery, device 802 sends a key information request to the network/CP 804, in a further step 8:3, e.g. in a SIP subscribe message. In response thereto, network/CP 804 sends information on a first media key MK(1) to device 802 in a following step 8:4, e.g. in a SIP notify message, and device 802 is able to derive the first media key MK(1) from the received key information and the previously received key generating key KGK in a next step 8:5. The key information may be a nonce or other variable parameter which is changed for each successive media key. A key identifier may also be sent with the key information for synchronisation as said above.

Device 802 then forwards the media key MK(1) to the second device 800 in a step 8:6 for decryption of received media, not shown. The user can then watch or otherwise experience the content when rendered by device 800. At some suitable point, device 802 sends a second key information request to network/CP 804, in a step 8:7, which then duly provides information on a second media key MK(2) to device 802 in a following step 8:8. After deriving the new media key MK(2) from the received key information in a next step 8:9, device 802 forwards key MK(2) to device 800 in a step 8:10 for decryption of further received media, and so forth.

This process of obtaining successive media keys can be repeated any number of times, e.g. depending on the granularity of keys used and if the user wants to continue the rendering on device 800. The sending of each new key information request may also be controlled in any suitable manner, e.g. by automatic requests at preset time intervals or by manual input. However, the user may for some reason decide to stop the media delivery, e.g. when not satisfied with the rendering results, or when he/she decides to do other things. Hence, it is entirely up to the user when to stop the delivery, if desired.

A next shown step 8:11 thus illustrates schematically that the user has stopped the sending of the next key information request, and in the absence of a request, network/CP 804 stops the delivery of further media in a final step 8:12. If the key information requests are received by the network, a delivery stop message is conveyed from the network to the content provider over a suitable control channel or the like. On the other hand, this scheme with successive media keys also allows the content provider or the network to, independent of one another, stop the content delivery by simply stopping the delivery and ceasing the sending of new media keys to device 802, respectively. It should be noted that the content provider may at any time simply stop producing and delivering encrypted content. The network, on the other hand, can effectively stop media delivery by not sending key information.

An arrangement in a node of a communications network and an arrangement in a first user device, will now be described in more detail with reference to the block diagram of FIG. 9. The network node 904 is configured to enable the use of the first device 902 for controlling transfer of media content from a content provider 906 to a second device 900, while the first user device is configured to control transfer of the media content from content provider 906 to device 900, in accordance with further embodiments. The network node 904 and the first device 902 may be used to accomplish any of the above-described procedures and embodiments. The various functions therein are called "units" in this description, although they could also be seen as modules, blocks, elements or components. Again, it is assumed that the first device 902 has a pre-established security association with the communications network.

Figure 9:
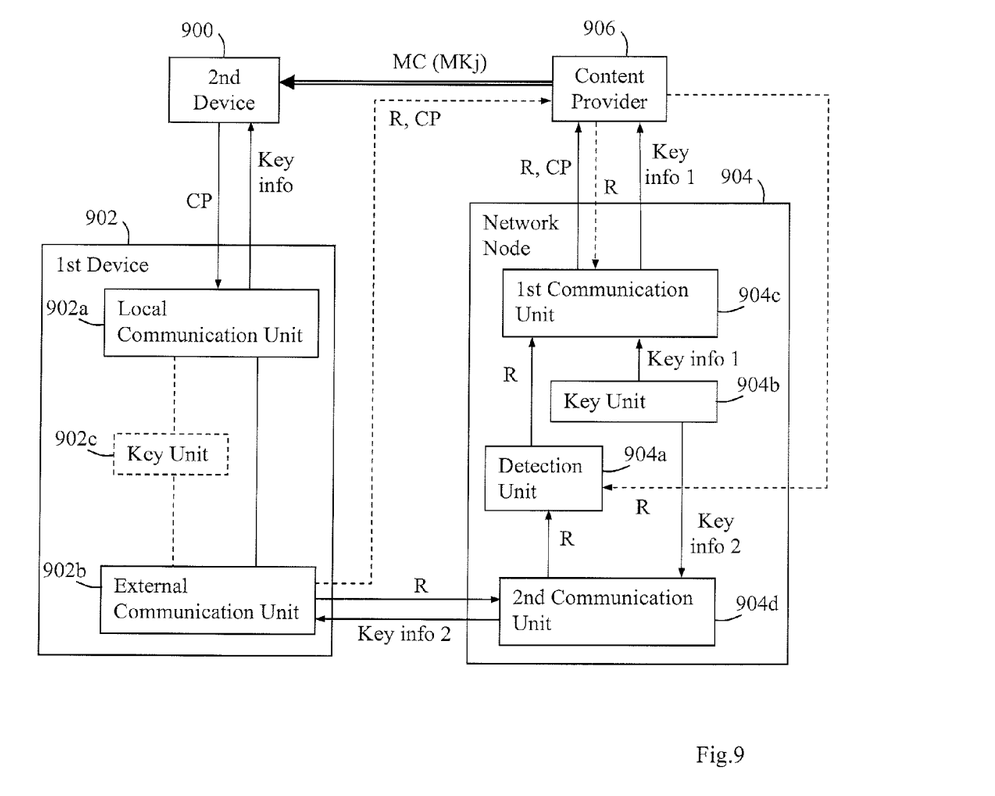
FIG. 9 is a schematic block diagram illustrating arrangements in a communications network node and a user device, respectively, in accordance with further embodiments.

According to the arrangements in FIG. 9, the network node 904 comprises a detection unit 904a adapted to detect a request R from the first device for delivery of media content to the second device, the request being directed to the content provider. The request may be detected when received from device 902 as in the example of FIG. 3, or when content provider 906, having received the request, makes an authorisation query as in the example of FIG. 4, in FIG. 9 indicated by dashed arrows.

Network node 904 also comprises a key unit 904b adapted to establish key information which enables determination of one or more media keys MKj for encryption of the media content, and a first communication unit 904c adapted to send a first set of key information on MKj to the content provider. Thereby, the content provider is able to determine the media key(s) from the received key information and deliver the requested content encrypted by the media key(s) to the second device. Network node 904 also comprises a second communication unit 904d adapted to send a second set of key information on MKj to the first device over a communication link. Thereby, the first device is able to forward the media key(s) or information thereof over a local communication link to the second device for decryption of received media content. As in the previous examples, the first and second sets of key information may be the same or different from each other.

The first device 902 comprises a local communication unit 902a adapted to establish the local communication link with the second device, and an external communication unit 902b adapted to make the request R, directed to the content provider 906, for delivery of media content to the second device 900. The content request R may also be sent with connection parameters CP of device 900. The external communication unit 902b is further adapted to receive key information from the communications network, i.e. the second set of key information above, which enables determination of one or more media keys MKj for decryption of the media content from the communications network.

Furthermore, the local communication unit 902a is further adapted to forward the media key(s) or the received key information on MKj over the local communication link to the second device, thereby enabling the second device to decrypt media content when received from the content provider. The first device 902 may further comprise a key unit 902c for determining media keys from key information received from the network, if necessary.

It should be noted that FIG. 9 merely illustrates various functional units or modules in the network node 904 and user device 902 in a logical sense, although the skilled person is free to implement these functions in practice using suitable software and hardware means. Thus, the invention is generally not limited to the shown structures of the entities 904 and 902, respectively, while its functional units 904a-d and 902a-b may be configured to operate according to the methods and procedures described above for FIGS. 3-8, where appropriate.

By employing the invention according to any of the above-described aspects and embodiments, the user of the first device can initiate authorised and controlled transfer of media content to any foreign second device, without requiring authorisation of the second device nor a secure link for media transfer thereto, although without excluding that the second device is authorised towards the content provider, for example. This solution can thus be made quite user-friendly, flexible and secure. Furthermore, when successive encryption and multiple media keys are used, both the user and the content provider are able to stop the transfer of media, providing enhanced control of the process.

While the invention has been described with reference to specific exemplary embodiments, the description is only intended to illustrate how the invention can be implemented and used in some situations but should not be taken as limiting the invention. Although the concepts of IPTV, IMS, SIP, ISIM, AKA, GBA, UPnP and DLNA have been used when describing the above embodiments, any other similar suitable standards, protocols and network elements may basically be used for enabling the encryption and transfer of content as described herein. The invention is generally defined by the following independent claims.

The invention claimed is:

1. A method in a communications network for enabling the use of a first device for controlling transfer of media content from a content provider to a second device, the first device having a pre-established security association with said communications network, the method comprising:
    detecting a request, made by the first device, that media content be delivered to the second device, the request being directed to the content provider;
    establishing key information, including first and second sets of key information, which enables determination of one or more media keys for encryption of said media content; and
    sending the first set of key information to the content provider and the second set of key information to the first device, wherein the content provider delivers the requested media content encrypted by said one or more media key to the second device, and the first device is configured to forward the one or more media keys or information thereof over a local communication link to the second device for decryption of media content encrypted by said one or more media keys when delivered by the content provider;
    wherein each of the first device, the second device, and the content provider are distinct from each other;
    wherein the first device and second device are end-user devices.

2. The method according to claim 1, wherein the established key information is used for determination of a series of media keys to be used in a pre-determined order for encryption of the requested media content, and wherein information regarding each media key is sent successively to the first device, thereby enabling the communications network to stop the delivery of content encrypted by the one or more media keys by stopping the sending of key information.

3. The method according to claim 2, wherein a key identifier associated with each media key is sent to the first device and forwarded to the second device, and the content provider adds said key identifier to media content encrypted by the associated media key, for synchronization between received media and media keys in the second device.

4. The method according to claim 2, wherein the media keys are changed at preset time intervals or for preset chunks of delivered content.

5. The method according to claim 2, wherein successive requests for key information are needed from the first device for sending information on the successive media keys to the first device, thereby enabling also the first device to stop the delivery of content by ceasing the requests for key information.

6. The method according to claim 5, wherein the requests for key information are received in SIP Subscribe messages from the first device, and the information on the successive media keys is sent in SIP Notify messages to the first device in response to said SIP Subscribe messages.

7. The method according to claim 1, wherein the key information comprises one or more explicit media keys or one or more implicit media key related parameters from which the one or more media keys can be determined.

8. The method according to claim 7, wherein the pre-established security association involves a first base key and the one or more implicit media key related parameters include at least one nonce, wherein said one or more media keys can be derived from said first base key and said at least one nonce.

9. The method according to claim 8, wherein the first set of key information sent to the content provider comprises a second base key dependent of said first base key, and the content provider uses the second base key to derive a series of media keys and sends information regarding the media keys successively to the first device.

10. The method according to claim 1, wherein the content request from the first device contains connection parameters of the second device which are used by the content provider for delivering the media content to the second device.

11. The method according to claim 1, wherein said request is detected when received at the network from the first device.

12. The method according to claim 1, wherein said request is detected when the content provider has received the request from the first device, and wherein the content provider sends key information to the first device in accordance with GBA (Generic Bootstrapping Architecture) as specified in 3GPP, and wherein said first device generates the media keys therefrom.

13. An arrangement in a communications network node configured to enable the use of a first device for controlling transfer of media content from a content provider to a second device, the first device having a pre-established security association with said communications network, comprising:
    one or more processing circuits configured to:
        detect a request, made by the first device, that media content be delivered to the second device, the request being directed to the content provider;
        establish key information, including first and second sets of key information, which enables determination of one or more media keys for encryption of said media content;
    one or more communications circuits configured to:
        send the first set of key information to the content provider, thereby enabling the content provider to deliver the requested content encrypted by said one or more media keys to the second device;
        send the second set of key information to the first device, thereby enabling the first device to forward the media keys or information thereof over a local communication link to the second device for decryption of media content encrypted by said one or more media keys when delivered by the content provider;
    wherein each of the first device, the second device, and the content provider are distinct from each other;
    wherein the first device and second device are end-user devices.

14. The arrangement according to claim 13, wherein the established key information is used for determination of a series of media keys to be used in a pre-determined order for encryption of the requested media content, and wherein the second communication unit is further adapted to send information regarding each media key successively to the first device, thereby enabling the communications network to stop the delivery of content encrypted by the one or more media keys by stopping the sending of key information.

15. The arrangement according to claim 14, wherein the second communication unit is further adapted to send a key identifier associated with each media key to the first device, and the content provider adds said key identifier to media content encrypted by the associated media key, for synchronization between received media and media keys in the second device.

16. The arrangement according to claim 14, wherein the media keys are changed at preset time intervals or for preset chunks of delivered content.

17. The arrangement according to claim 14, wherein successive requests for key information are needed from the first device for sending information on the successive media keys to the first device, thereby enabling also the first device to stop the delivery of content by ceasing the requests for key information.

18. The arrangement according to claim 17, wherein the second communication unit is further adapted to receive the requests for key information in SIP Subscribe messages from the first device, and to send the information on the successive media keys in SIP Notify messages to the first device in response to said SIP Subscribe messages.

19. The arrangement according to claim 13, wherein the key information comprises one or more explicit media keys or one or more implicit media key related parameters from which the one or more media keys can be determined.

20. The arrangement according to claim 19, wherein the pre-established security association involves a first base key and the one or more implicit media key related parameters include at least one nonce, wherein said one or more media keys can be derived from said first base key and said at least one nonce.

21. The arrangement according to claim 20, wherein the first set of key information sent to the content provider comprises a second base key dependent of said first base key, and the content provider uses the second base key to derive a series of media keys and sends information regarding the media keys successively to the first device.

22. The arrangement according to claim 13, wherein the content request made by the first device contains connection parameters of the second device which are used by the content provider for delivering the media content to the second device.

23. The arrangement according to claim 13, wherein the detecting unit is further adapted to detect said request when received at the network from the first device.

24. The arrangement according to claim 13, wherein the detecting unit is further adapted to detect said request when the content provider has received the request from the first device, and wherein the content provider sends key information to the first device which generates the media keys therefrom, in accordance with GBA (Generic Bootstrapping Architecture) as specified in 3GPP.

25. A method, in a first device, for controlling transfer of media content from a content provider to a second device, comprising:
    establishing a local communication link with the second device;
    making a request that media content be delivered to the second device, the first device having a pre-established security association with a communications network, and the request being directed to the content provider;
    receiving key information which enables determination of one or more media keys for decryption of said media content; and
    forwarding the one or more media keys or said key information over said local communication link to the second device, thereby enabling the second device to decrypt media content when received from the content provider;
    wherein each of the first device, the second device, and the content provider are distinct from each other;
    wherein the first device and second device are end-user devices.

26. The method according to claim 25, wherein connection parameters of the second device are obtained over the local communication link and said request is sent with the connection parameters to the communications network or to the content provider.

27. The method according to claim 25, wherein the established key information is used for determination of a series of media keys to be used in a pre-determined order for encryption of the requested media content, and wherein the first device receives information regarding each media key successively from the communications network or from the content provider, thereby enabling the communications network or the content provider to stop the delivery of content encrypted by the one or more media keys by stopping the sending of key information.

28. The method according to claim 27, wherein the first device receives a key identifier associated with each media key and forwards the key identifier to the second device, and wherein the content provider adds said key identifier to media content encrypted by the associated media key, for synchronization between received media and media keys in the second device.

29. The method according to claim 27, wherein the first device sends successive requests for key information to obtain information on the successive media keys, thereby enabling also the first device to stop the delivery of content by ceasing the requests for key information.

30. The method according to claim 29, wherein the first device sends the requests for key information in SIP Subscribe messages, and receives the information on the successive media keys in SIP Notify messages in response to said SIP Subscribe messages.

31. The method according to claim 25, wherein the key information comprises one or more explicit media keys or one or more implicit media key related parameters from which the one or more media keys can be determined.

32. The method according to claim 31, wherein the pre-established security association involves a base key and the one or more implicit media key related parameters include at least one nonce, wherein said one or more media keys can be determined from said base key and said at least one nonce.

33. The method according to claim 25, wherein the first device sends said request to the communications network.

34. The method according to claim 25, wherein the first device sends said request to the content provider and receives key information from the content provider, in accordance with GBA (Generic Bootstrapping Architecture) as specified in 3GPP, to generate the media keys therefrom.

35. An arrangement, in a first device, for controlling transfer of media content from a content provider to a second device, comprising:
    one or more communications circuits configured to:
        establish a local communication link with the second device; and
        make a request that media content be delivered to the second device, the first device having a pre-established security association with a communications network and the request being directed to the content provider;
        receive, via the communications network, key information which enables determination of one or more media keys for decryption of said media content from the communications network; and forward, via the local communications link, the one or more media keys or said key information over said local communication link to the second device, thereby enabling the second device to decrypt media content when received from the content provider;

wherein each of the first device, the second device, and the content provider are distinct from each other;

wherein the first device and second device are end-user devices.

\* \* \* \* \*

UNITED STATES PATENT AND TRADEMARK OFFICE
CERTIFICATE OF CORRECTION

PATENT NO. : 8,738,910 B2  
APPLICATION NO. : 13/514100  
DATED : May 27, 2014  
INVENTOR(S) : Selander et al.

Page 1 of 1

It is certified that error appears in the above-identified patent and that said Letters Patent is hereby corrected as shown below:

In the Specification

In Column 14, Line 39, delete ""SPI" and insert -- "SIP --, therefor.

In Column 14, Line 41, delete "SPI" and insert -- SIP --, therefor.

Signed and Sealed this
Fourteenth Day of October, 2014

Michelle K. Lee
*Deputy Director of the United States Patent and Trademark Office*